Figure 7:
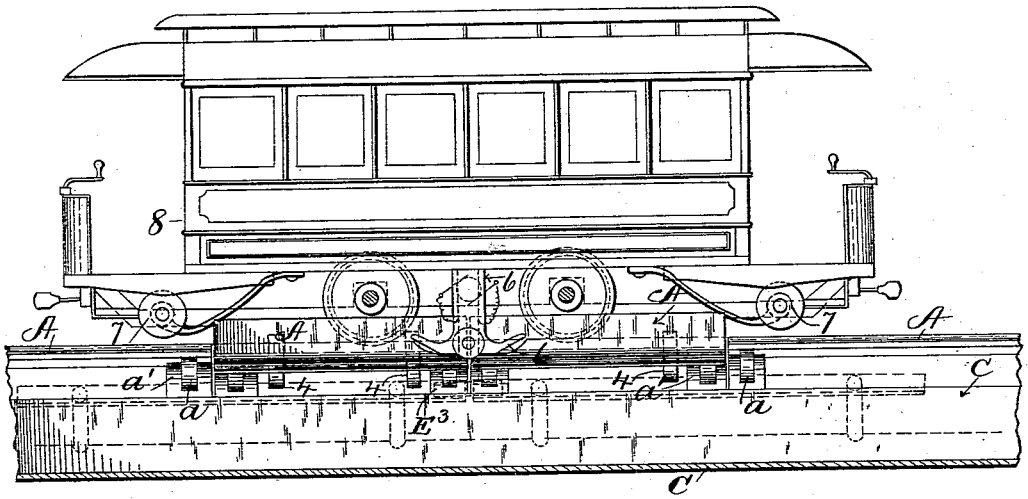

(No Model.) 4 Sheets—Sheet 1.
W. R. EDELEN.
CLOSED CONDUIT AND APPLIANCE FOR ELECTRIC RAILROADS.
No. 557,784. Patented Apr. 7, 1896.
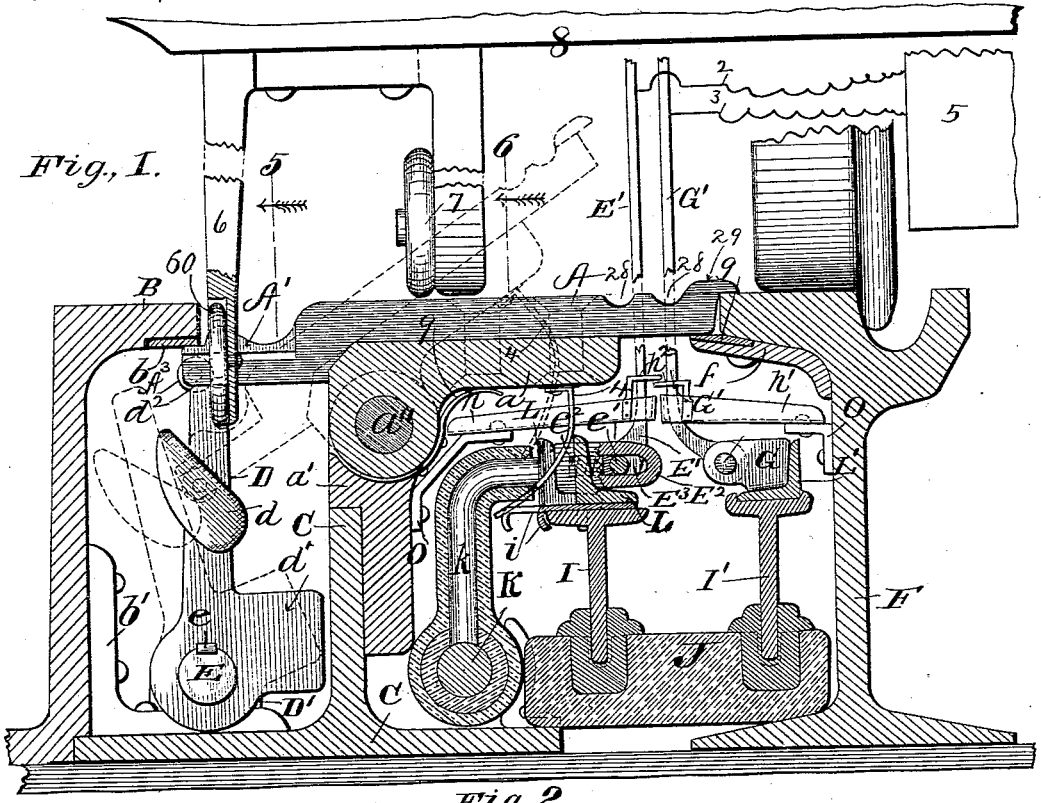
Fig., 1.
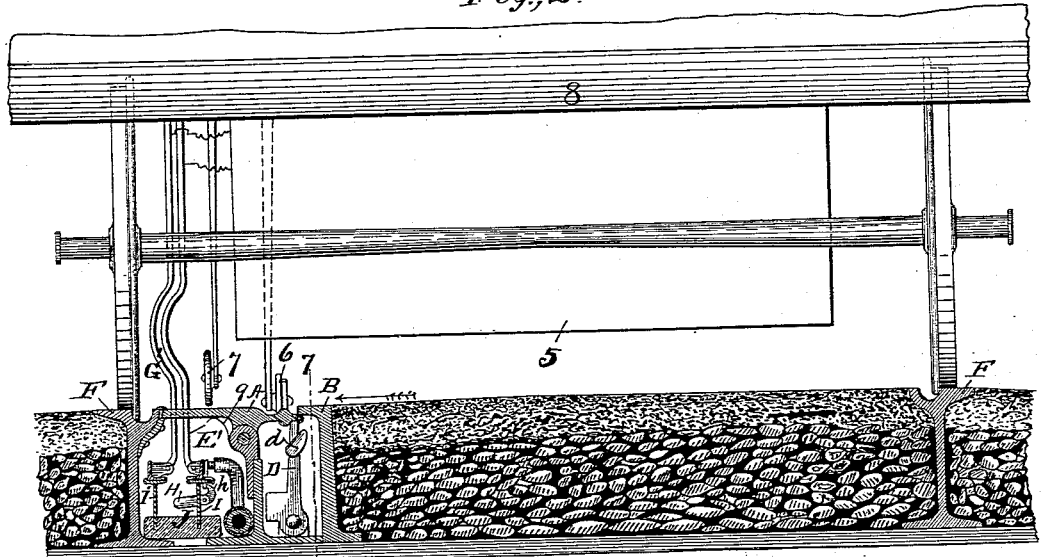
Fig., 2.
Witnesses. Inventor.
William Rees Edelen (No Model.) 4 Sheets—Sheet 2.
W. R. EDELEN.
CLOSED CONDUIT AND APPLIANCE FOR ELECTRIC RAILROADS.
No. 557,784. Patented Apr. 7, 1896.
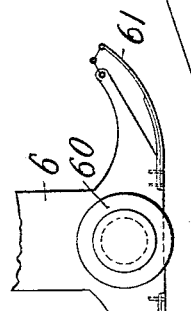
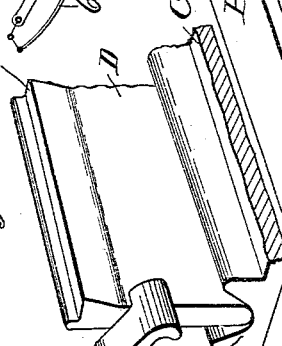
Witnesses. Inventor.
William Rees Edelen

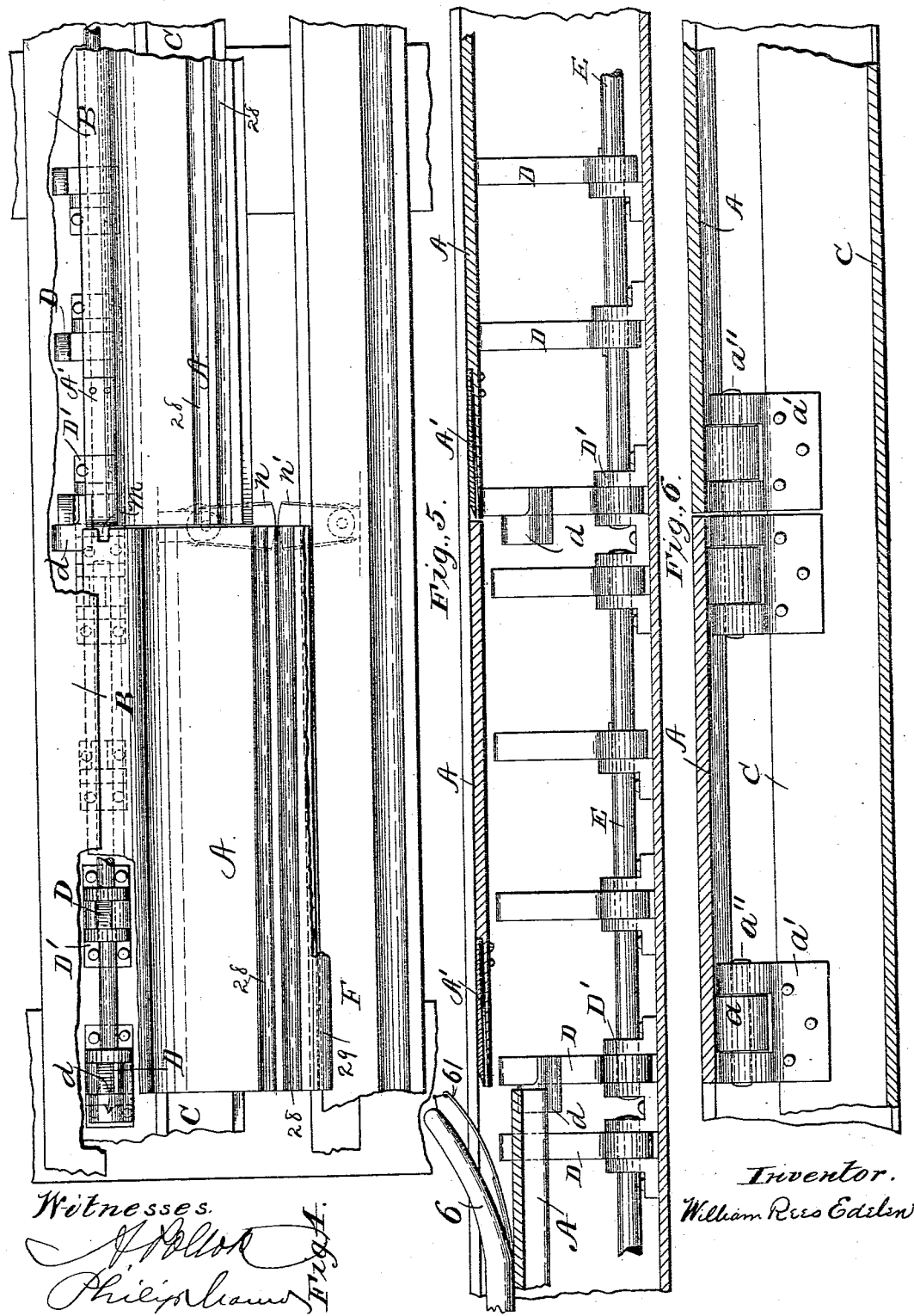

(No Model.) 4 Sheets—Sheet 4.

W. R. EDELEN.
CLOSED CONDUIT AND APPLIANCE FOR ELECTRIC RAILROADS.

No. 557,784. Patented Apr. 7, 1896.

Witnesses

Inventor
William Rees Edelen

UNITED STATES PATENT OFFICE.

WILLIAM REES EDELEN, OF WASHINGTON, DISTRICT OF COLUMBIA.

CLOSED CONDUIT AND APPLIANCE FOR ELECTRIC RAILROADS.

SPECIFICATION forming part of Letters Patent No. 557,784, dated April 7, 1896.

Application filed November 16, 1895. Serial No. 569,131. (No model.)

*To all whom it may concern:*

Be it known that I, WILLIAM REES EDELEN, a citizen of the United States, residing at Washington, in the District of Columbia, have invented certain new and useful Improvements in Closed Conduits and Appliances for Electric Railroads; and I do hereby declare the following to be a full, clear, and exact description of the invention, such as will enable others skilled in the art to which it appertains to make and use the same.

My invention has reference to improvements in closed conduits and appliances for electric railroads; and it consists of certain novel features of construction, which will be hereinafter described, and pointed out in the claims.

The object of the present invention is to obviate the difficulties which have heretofore existed in longitudinally-slotted conduits and other electric railways and also to insure greater safety in providing means whereby mischievous or ignorant persons cannot tamper with the conducting-wires; also, to provide more efficient means for excluding water and moisture.

A further object of the invention is to afford a much cheaper conduit system or subway whereby the road-bed of an existing car-line need not be disturbed when necessary to change the same to an electric railway.

The salient features of my invention consist in a series of covers having no visible longitudinal slot or opening and which may be pivoted or hinged to an inverted T-beam and supported on the trolley side by a car-track or a Z-beam, the opposite side of said cover resting against the under edge of a Z-beam and supported and held rigidly in this position by posts secured to a rock-shaft and which are manipulated by the action of the tilting cover through the medium of a shoe attached to a motor-car.

My invention further consists in providing pivoted troughs at the terminals of each conduit-cover for receiving any water or moisture that might enter. These troughs at their free ends project somewhat beyond the line of travel of the trolleys and by which they are pushed aside, returning again to their normal position through suitable mechanism.

My invention further consists in providing circuit mechanism whereby much of the current is saved from leakage through the action of the conduit-covers, which have depending springs of such consistency or resilience as to force sectional conductor rails or bars away from contact with suitable points of the trolley-circuit, said circuit being closed only when the covers are elevated and the sectional rails make contact with said points.

My invention further consists in the novel construction of a trolley whereby in passing from one conductor-rail to a succeeding rail the circuit is established through the latter before it is broken through the former, thereby preventing sparking.

Figure 8:
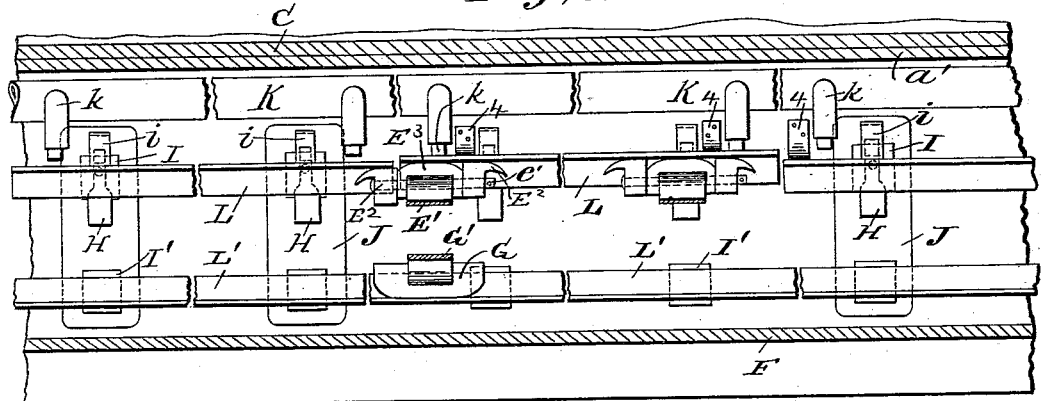
Figure 9:
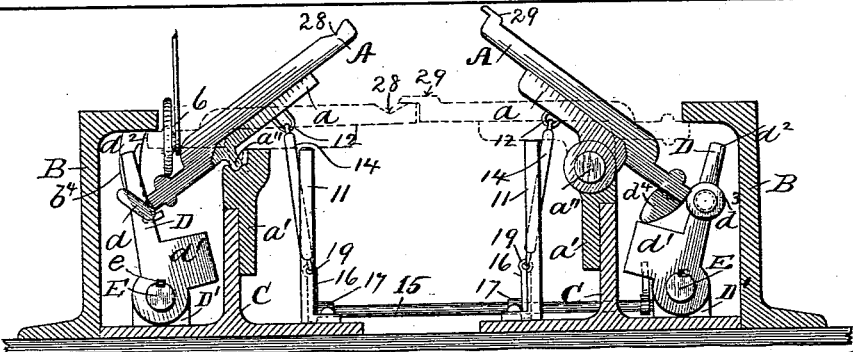

In the drawings, Figure 1 is a transverse vertical section of my improved closed conduit with the supporting-posts and cover shown in full and also in dotted lines, thus exhibiting the internal mechanism, and also a portion of a car with its accompanying shoes and trolleys. Fig. 2 is a transverse vertical section through a road-bed and conduit. Fig. 3 is a perspective view of the closed conduit with one cover open. Fig. 4 is a plan view with one of the covers open. Fig. 5 is a section on line 5 of Fig. 1. Fig. 6 is a section on line 6 of Fig. 1. Fig. 7 represents a longitudinal section through the conduit, taken on line 7 of Fig. 2, two covers beneath the car being open. Fig. 8 is a horizontal section through the conduit, showing the inclosed mechanism in plan view. Fig. 9 is a transverse section of a modified form of conduit. Figs. 10 and 11 are details of the trolley and spring-shoe. Fig. 12 shows a modification of the post-locking mechanism for the covers.

A A represent a series of covers which at one edge rest upon a lip or flange $f$, which may be part of or bolted to the track, and at the other edge extend under the projecting flange of a Z-beam B, being provided with suitable packing at both edges, as indicated at $b$ and $g$.

The covers A are preferably made of rolled iron and hinged near the middle of their under side by a pin $a''$, which passes through eye-irons $a$ and $a'$. In Fig. 9 the hinged point is merely a fulcrum, the cover being prevented from leaving its seat by means of arc-shaped arms $b^4$, secured to the under side of beam B.

Cover A is supported by an inverted T-beam C, which is bolted by angle-irons $b'$ to the Z-beam B, said beams resting on and being secured to the ordinary car-rail ties. On the beams C are suitable bearings $D'$ for supporting rock-shafts E, to which tilting posts D are keyed at $e$, said posts in their normal positions engaging under and supporting cover A. These posts are preferably five in number for each rock-shaft and its corresponding cover, one outermost post on each shaft being provided with an inclined lug or roller $d$ $d^3$, with which a friction-roller $A^3$ or lug $d^4$ (see Figs. 1 and 9) on a contiguous cover is adapted to make engagement when said cover is opened, tilting all of the posts, through the medium of the rock-shaft, away from under the next succeeding cover, according to the direction of the movement of the car, thereby freeing the same to be opened upon by means heretofore referred to. A shoe 6, depending from the car 8 and carrying a friction-roller 60, rides along and depresses the covers in succession at one edge, tilting them to such position as to open the conduit at their other edges and permit the passage therethrough of the trolley. Each cover is adapted to return to its closed position by gravity as soon as the shoe 6 passes to the next succeeding cover. To insure such closure, however, before the car passes from above the cover, I place a depending spring-roller 7 on the rear of the car.

In order that the shoe 6 may pass from one cover to the next with as little shock or jar as possible, the shoe is faced with springs 61, which first make contact with spring-plate $A'$, arranged at one end of the cover.

The covers come closely together at their transverse joints; but to prevent water from entering said joints I have provided pivoted troughs $n$ and $n'$, mounted on suitable brackets $o$ $o$ and adapted to be pushed to one side by the traveling trolley-arms $E'$ and $G'$ as they pass through the conduit, said troughs being returned to their normal position by suitable springs or other mechanism. Projecting from troughs $n$ and $n'$ are insulated rods $n^2$, against which the trolley-arms strike in pushing the troughs aside. (See Figs. 1 and 4.)

Secured to the under side of covers A are two springs 4 4 for each cover. These springs are adapted to hold the short sectional bars L away from the contact-points $k$ when the covers are closed. The sectional rails L, and also the continuous rail $L'$, connecting with the negative pole of the electric generator, are mounted on vertical supports I and $I'$ and insulated by blocks J. The sectional bars L are provided with stops $i$, which abut against the edges of supports I, being held in this position by the closed covers A through the medium of spring-arms 4 4, previously referred to.

The trolley-arm $G'$ carries a trolley-shoe G, and the trolley-arm $E'$ a trolley-shoe $E^3$, which forces the bar L against contact-points $k$, the arms $G'$ and $E'$ being resilient and having a tendency to spread at their lower extremities, the covers corresponding to the bar being open, and thereby completing the circuit from said points through the bar L, trolley-shoe $E^3$, trolley-arm $E'$, wire 2, motor 5, thence returning through wire 3, trolley-arm $G'$, and to the rail $L'$ by the trolley-shoe G. As soon as the trolley-shoe passes from one rail L to the next the former is returned to its normal position by the dropping of the cover, such movement being limited by the stops $i$, heretofore referred to.

The trolley-shoe $E^3$ is of special construction, in order that it may ride from one rail L to the next without causing a break in the circuit and consequent sparking, which is very injurious to the mechanism employed. Such special construction consists mainly in providing the shoe $E^3$ with two toe-pieces $E^2$ $E^2$, arranged, respectively, on opposite ends of the shoe $E^3$, secured thereto by a pin $e'$, and each actuated by a spring $e^2$. The operation of this arrangement will best be understood by reference to Fig. 8, from which it will be observed that the rail L has slightly left the contact-points $k$, such slight movement being effected by the springs 4, the preceding rail L remaining, however, in contact with toe-piece $E^2$, which it forces back. Before such action takes place the succeeding rail L has been forced against its points $k$ and the circuit completed therethrough. By such devices it will be noticed that there is no break in the circuit, which is completed through one rail before it is broken through another. The same results are accomplished in the modification shown in Figs. 2 and 8, respectively, for sliding sectional bars L, similar to spring-arms 4 4, which consists in providing weighted levers H with the small end $h$ resting against a pin secured in stops $i$, said stops being secured to rails L.

In Fig. 9 I have shown a construction similar to that shown in Fig. 1, with the exception that two series of covers are exhibited, which in some instances has advantages over a single series, as where a larger opening is desirable on account of the oscillation of a fast-traveling train. The covers are supported by posts with their ends $d^2$ resting under said covers, as in the other figures of the drawings. Lugs $d^4$ and rollers $d^3$, as shown to the right in Fig. 9, can be employed for effecting the tilting of the supporting-posts, acting in a manner similar to the devices previously referred to. In such an arrangement shown in Fig. 9 the covers at each side of the conduit can be tilted by separate shoes 6, or, as shown in the same figure, only one shoe may be employed and the covers connected so that they tilt together. Such connections consist of a staple 12, secured under each cover, connected by pitmen 14, arms 16, by means of eyes 19, said arms being carried by a rock-shaft 15, having bearings 17. It will be observed that the shaft 15 is extended and carries a lever at its extreme end for tilting posts D when starting a car at the terminus of a road. For giving greater stability to this system of double covers I employ posts 11 11 at suitable intervals.

In Figs. 1 and 2 a spring 9 is secured under cover A, the free end of which presses under said cover, so as to ease the momentum caused by the weight of the same when closing.

To open any of the covers for the purpose of gaining access to the interior of the conduit, an iron bar can be inserted in opening $m$ in covers A at suitable intervals, (shown at Fig. 4,) said bar impinging upon lug $d$ on one of the posts D for the purpose of tilting the latter to permit the opening of the cover.

The covers are provided with longitudinal gutters or grooves 28 28 for shedding water. The edges of said covers are also provided with a projecting flange or lip 29, extending their entire length.

From the foregoing description it will be understood that in their normal closed positions the covers are locked by the posts D, which automatically return to such locking position by the action of gravity through the medium of suitable weights, such as $d'$, or suitable springs. As the car passes along the track each cover in its turn is released by the opening of the preceding cover, so that it can be properly opened by the shoe 6, which, as soon as the shoe 6 passes off of the cover, it closes, and is automatically locked by the posts D, as heretofore described. The covers are preferably made of such dimensions that they are opened and closed while the car is above them. Other details of operation will be fully understood from the description.

That which I claim as new, and desire to secure by Letters Patent of the United States, is—

1. A closed conduit for electric and other railways, having a series of covers, each normally locked in a closed position, and adapted to be released or unlocked by the movement of a preceding cover, substantially as described.

2. A closed conduit for electric and other railways, having a series of normally-closed covers, means for automatically locking each cover in a closed position adapted to be actuated to unlock or release said cover upon the movement of a neighboring cover, substantially as described.

3. A closed conduit for electric railways having a series of hinged covers, means—such as a post—for locking each of said covers in a closed position, and connections for successively moving said means from its locking position upon the opening of preceding covers, substantially as described.

4. A closed conduit having a series of covers longitudinally hinged between their edges, a ledge or projection overhanging one edge of said covers, and means engaging under and concealed by the covers for locking the same in a closed position, substantially as described.

5. A closed conduit having a series of covers longitudinally hinged between their edges; a ledge or projection overhanging one edge of, and with which said covers engage when closed, and means engaging under said edge of the cover for locking it when closed, substantially as described.

6. In a closed conduit for an electric railway provided with sectional covers hinged within said conduit, supporting-posts, and means for tilting said posts and covers alternately through the medium of a shoe attached to a motor-car, substantially as described.

7. The combination with a closed conduit having a series of covers hinged between their longitudinal edges, of a depending arm on the car adapted to engage the upper face of said covers at one side of the hinge for tilting the covers to open the conduit, substantially as described.

8. A closed conduit having a series of covers, of spring-actuated pivoted troughs arranged transversely across the conduit under the edges of said covers, and adapted to be swung aside upon the passage of a trolley therethrough, substantially as described.

9. A closed conduit having a series of covers engaging, at one edge under an overhanging ledge or projection at the side of the conduit, and at its other edge overlapping the edge of the conduit, said covers being hinged between its edges and means for engaging the under edges of said covers for locking the same in a closed position, substantially as described.

10. The combination with a conduit of a conducting-rail in said conduit arranged in movable insulated sections, a circuit terminal for each section, said sections being normally out of contact therewith, but adapted to be moved into contact by the passage of a trolley therealong, a series of covers for closing the conduit, and means on said covers for restoring the corresponding conductor-sections to their normal positions upon the closure thereof, substantially as described.

11. A conductor having a series of covers longitudinally hinged between their edges, of packing interposed between said edges and the adjoining portions of the conduit, said covers being formed with water-conducting grooves adjacent to the longitudinal edges substantially as described.

12. In a conduit the combination with a sectional conductor-rail of a trolley-shoe for successively making contact therewith, having a spring-actuated toe-piece at each end thereof, as specified.

13. The combination with a conduit having a series of hinged closing-covers, of a depending shoe on the car for opening said covers, and a spring at each end of said shoe with which the covers make contact substantially as described.

14. The combination with a conduit having a series of covers, of spring contact-plates at the end of said covers for receiving the thrust of a shoe attached to a motor-car.

15. In combination with a cover of a closed conduit, and springs secured in the same, and adapted to retard the closing of said cover.

In testimony whereof I affix my signature in presence of two witnesses.

WILLIAM REES EDELEN.

Witnesses:
J. ROSS COLHOUN,
JOHN HAHNE.